No. 724,767. PATENTED APR. 7, 1903.
W. O. WORTH.
MOTOR VEHICLE CONTROLLING DEVICE.
APPLICATION FILED MAY 10, 1902.
NO MODEL. 2 SHEETS—SHEET 1.
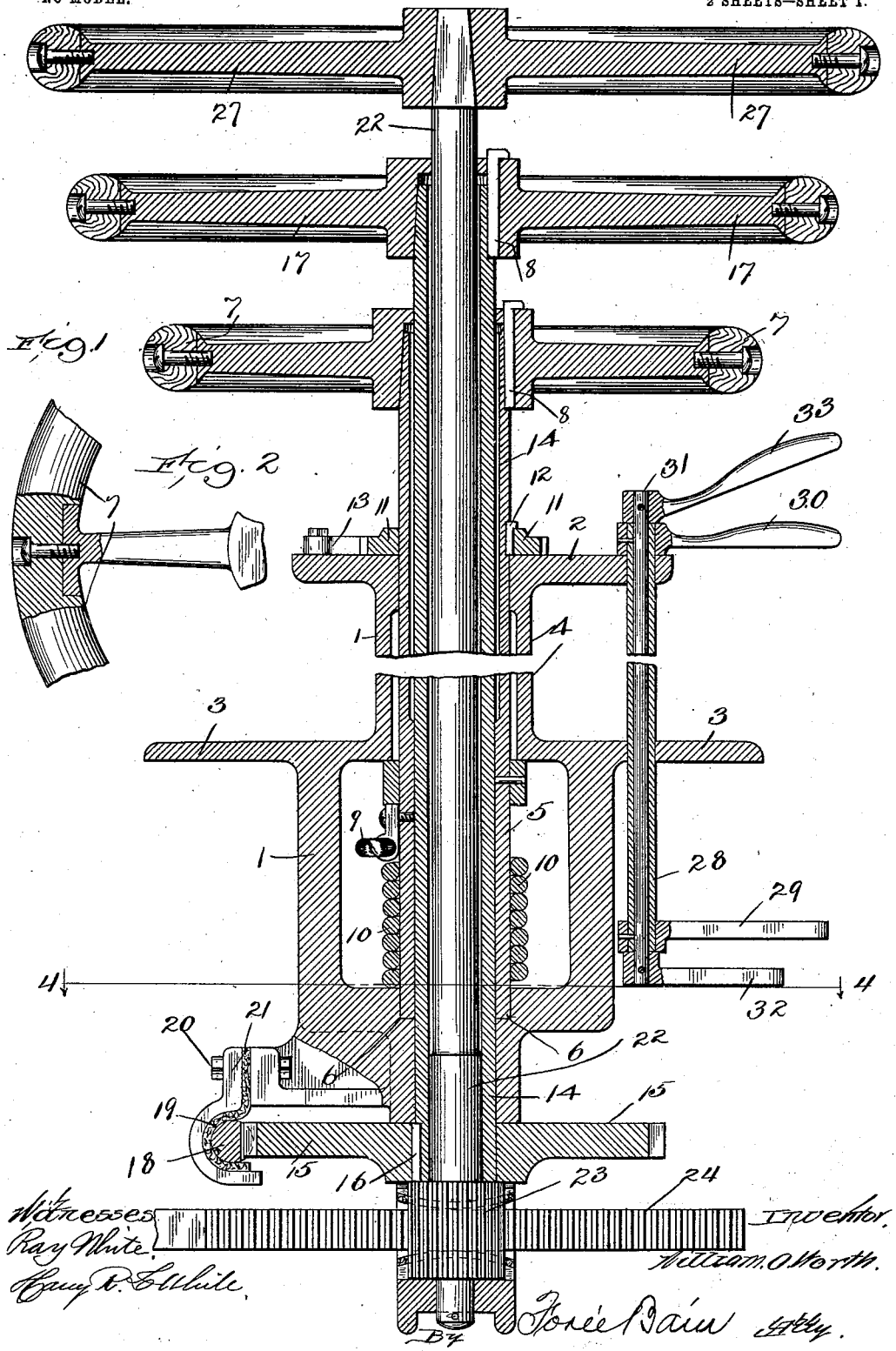

No. 724,767. PATENTED APR. 7, 1903.
W. O. WORTH.
MOTOR VEHICLE CONTROLLING DEVICE.
APPLICATION FILED MAY 10, 1902.
NO MODEL. 2 SHEETS—SHEET 2.
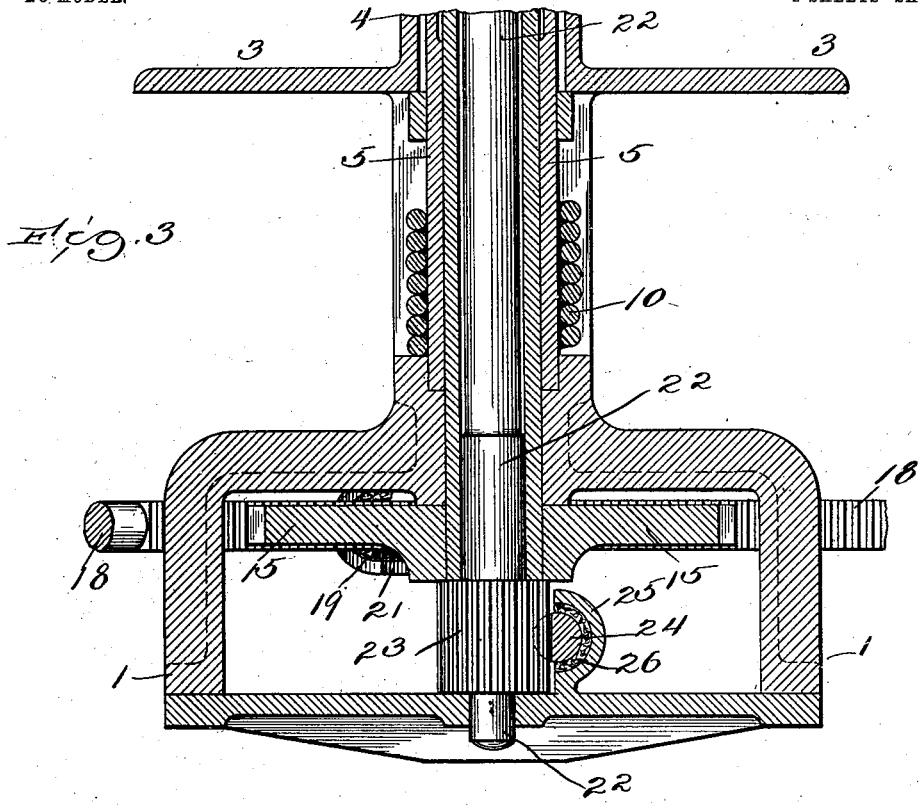
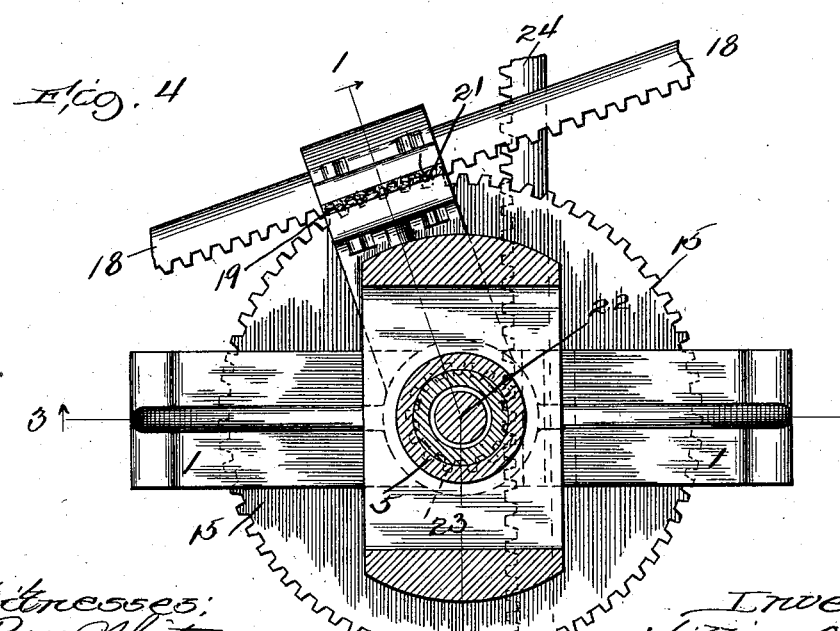
Witnesses:
Ray White
Harry R. White
Inventor
William O. Worth.
By Joneé Bain Atty

UNITED STATES PATENT OFFICE.

WILLIAM O. WORTH, OF CHICAGO, ILLINOIS, ASSIGNOR OF TWO-THIRDS TO WILLIAM R. DONALDSON, OF LOUISVILLE, KENTUCKY, AND HENRY W. KELLOGG, OF BATTLECREEK, MICHIGAN.

MOTOR-VEHICLE CONTROLLING DEVICE.

SPECIFICATION forming part of Letters Patent No. 724,767, dated April 7, 1903.

Application filed May 10, 1902. Serial No. 106,677. (No model.)

*To all whom it may concern:*

Be it known that I, WILLIAM O. WORTH, of Chicago, in the county of Cook and State of Illinois, have invented certain new and useful Improvements in Motor-Vehicle Controlling Devices; and I hereby declare that the following is a full, clear, and exact description thereof, reference being had to the accompanying drawings, which form part of this specification.

My invention relates to improvements in motor-vehicle controlling devices.

The object of my invention is to provide a device whereby the various and numerous operative parts of a motor-vehicle may be conveniently controlled from a given point and supported by a structure common to all.

A further object of my invention is to combine in a single structure a means for controlling the speed of a vehicle, the direction in which it travels, and a means for applying the brake for stopping the same, organized and arranged in a manner convenient to the operator and combined in a single structural device.

It further consists of a self-contained structure combining the features described, with additional means whereby the supply of fuel fed to the engine for propelling the vehicle may be controlled, and, furthermore, a means for the purpose of changing the rate of speed of the said engine by varying the adjustment of the centrifugal speed-governor for that purpose.

With these and other objects in view, which may hereinafter appear, my invention consists in the features, arrangements, and combinations of parts, as will be hereinafter described, and specifically pointed out in the appended claims.

In the drawings, Figure 1 is an elevation of my device in section. Fig. 2 is a broken-away part of one of the hand-wheels, showing the construction thereof in section. Fig. 3 is a broken-away part of my device, showing the same in section taken on lines 3 3 of Fig. 4. Fig. 4 is a plan view, partly in section, taken on line 4 4 of Fig. 1.

In all of the views the same numerals of reference indicate similar parts.

1 is a supporting structure shown in a vertical position, provided with flanges 2 and 3. It is shown broken in two at the point 4. A section at this point may be inserted, so as to raise the hand-wheels to any convenient height. A vertical central hollow shaft 5 passes through the support 1 and rests on a step at the point 6 therein. The upper end of this shaft is provided with a hand-wheel 7, which is rotatably fixed to the upper tapered end of the shaft 5 by means of the key 8. The lower end of the shaft 5 is provided with a fastening or clip 9, to which a cable 10 is attached, and affords a spindle or core, around which the cable is adapted to be wound. The free end of the cable is connected to the braking mechanism of the vehicle, by means of which friction is applied to the traction-wheels for the purpose of stopping the motion of the vehicle when the cable 10 is wound around the shaft 5 by rotating the hand-wheel 7.

Upon the upper end of the shaft 5, resting upon the flange 2, is a brake ratchet-wheel 11, which is secured thereto by the key 12. A ratchet-dog or detent 13 is pivoted to the flange 2 and is a means for holding the shaft 5 in position when the said dog engages with the said ratchet-wheel. A hollow shaft 14, somewhat longer than the shaft 5, is placed therein and extends below the structure 1, contains on its lower end a geared pinion 15, which is held thereto by means of the feather 16. The upper tapered end of the shaft is provided with a hand-wheel 17, which is similar in every respect to the hand-wheel 7, only that it is, preferably, somewhat larger in diameter. The gear-pinion 15 meshes into a rack 18, which is adapted to be reciprocated thereby and which is guided in a clip 19, secured to structure 1 by means of the bolts 20.

For the purpose of retaining the rack 18 in the position in which it is placed by means of the pinion 15 a friction-lining 21 of the clip 19 is placed inside of the said clip and held in position by means of the bolts 20. The friction-lining 21 may be composed of rubber or other similar yielding material, so as to exert a pressure between the clip 19 and the pinion 15 for the purpose described. The rack 18 is designed to be connected to the power-translating device or the like, whereby the speed of the vehicle may be controlled when the hand-wheel 17 is oscillated and the rack is reciprocated by the geared pinion 15, carried by the shaft 14. A small shaft 22, somewhat longer than the intermediate shaft 14, has fixed to its lower end a geared pinion 23, which meshes into a rack 24. This rack is connected to the mechanism which swivels the front wheels of the vehicle for the purpose of controlling its direction of motion or travel. The rack 24 is also surrounded with a clip 25 and a friction-lining 26 for the purpose of exerting some friction on the rack, so as to retain it in the position in which it has been placed when the hand-wheel 27 has been oscillated for this purpose. The hand-wheel 27 is placed on the tapered upper end of the shaft 22, which is preferably squared to prevent rotation of the wheel relative thereto. The shafts are all tapered at their upper ends, so that the respective wheels may be lifted off at any time and replaced conveniently. The keys 8 may be secured either to the respective shafts or to the hand-wheels.

For the purpose of controlling the adjustment of the speed-governor a hollow shaft 28 passes through the flanges 2 and 3. It is provided on its lower end with a lever 29 and on its upper end with a hand-lever 30. The lever 29 is connected by any suitable means to the speed-governor for changing the adjustment of the same, whereby the initial velocity of the engine may be increased or decreased, as desired, and regulated for a constant speed at the new velocity.

Passing through the center of the hollow shaft 28 is a shaft 31, which is provided on its lower end with a lever 32, which is designed to be connected to the fuel-reservoir and to a means whereby the supply of fuel may be shut off or governed, as desired. The upper end of the shaft 31 is provided with a hand-lever 33, by which the shaft may be rotated or oscillated, as desired.

The use and operation of my device are as follows: The upper hand-wheel 27 is in the most convenient position. It is a means by which the direction of the vehicle is controlled and is the wheel which is most often and most constantly used. The intermediate hand-wheel 17 is the one by which the speed of the vehicle is controlled, and for convenience it is located intermediate of the wheels 27 and 7, the latter being the wheel by which the brake of the vehicle is applied. The entire number of hand-wheels are adapted, as will be seen, to be oscillated around a common axis. They are all conveniently located and are ready for instant application and may be operated with celerity and certainty. Any two of the wheels may be operated at the same time when necessary. Instead of grading the size of the hand-wheels, as shown in the drawings, any convenient arrangement may be made—for instance, the brake-wheel 7 may be made larger, and the intermediate wheel 17 need not necessarily be the intermediate wheel in size.

The devices operated by the hand-levers 30 and 33 do not require much physical force. Therefore these devices are made small proportional to the other devices, and as they are not manipulated so frequently they are set to one side. They are, however, supported on the same structure and are convenient for operation at any and all times and are quickly accessible.

The arrangement of the various elements of my construction admits of rational changes without departing from the spirit and scope of my invention.

I do not desire my invention to be limited to the exact arrangement shown in the drawings, as the functions of the various concentric shafts are mutually interchangable and the connections between said shafts and the controllable features of the vehicle may be varied from those shown and herein described.

I claim—

1. A vehicle controlling device comprising a plurality of concentric shafts adapted to be oscillated, means for independently oscillating the shafts, friction devices adapted to retain said shafts in positions to which they have been moved, and connecting devices adapted to actuate controllable parts of the vehicle operatively associated with said shafts.

2. In a vehicle controlling device, a series of shafts, means for oscillating said shafts, devices adapted for operative connection with controllable parts of the vehicle arranged for actuation by said shafts, and friction-guides for said devices adapted to retain them in adjusted positions.

3. In a vehicle controlling device, a series of concentric shafts, a supporting-frame therefor, devices adapted for operative connection with the controllable parts of the vehicle arranged for actuation by the shafts, and guides 21, provided with friction-faces, secured to the frame and partially embracing the connection devices.

4. In a vehicle controlling device, a chambered support, a series of concentric shafts extending through the chamber, means for the attachment of a cable secured to the exterior shaft within the chamber of the support, a ratchet carried by said shaft outside of the support, a pawl secured to said support and arranged to coöperate with the ratchet, devices adapted for operative connection with controllable parts of the vehicle associated for actuation with the interior shafts of the series, and friction-guides secured to the supports and engaging the connecting devices.

In testimony that I claim the foregoing as my own I affix my signature in presence of two witnesses.

WILLIAM O. WORTH.

In presence of—
FORÉE BAIN,
MARY F. ALLEN.